(12) United States Patent
Tokunaga et al.

(10) Patent No.: US 6,566,447 B1
(45) Date of Patent: May 20, 2003

(54) RESIN COMPOSITION AND RESIN SHEET

(75) Inventors: Yasushi Tokunaga, Tokyo (JP);
Takafumi Nozawa, Tokyo (JP);
Etsushi Fukunaga, Tokyo (JP);
Yasunori Yamada, Tokyo (JP);
Motohiro Shimizu, Tokyo (JP)

(73) Assignee: Riken Vinyl Industry Co., LTD, Tokyo (JP)

( * ) Notice: Subject to any disclaimer, the term of this patent is extended or adjusted under 35 U.S.C. 154(b) by 0 days.

(21) Appl. No.: 10/151,311

(22) Filed: May 21, 2002

Related U.S. Application Data

(62) Division of application No. 09/601,322, filed as application No. PCT/JP99/00511 on Feb. 5, 1999, now Pat. No. 6,433,081.

(30) Foreign Application Priority Data

Feb. 6, 1998 (JP) ............................. 10-25690
Aug. 7, 1998 (JP) ........................... 10-224562

(51) Int. Cl.⁷ ............................................ C08F 293/00
(52) U.S. Cl. ...................................................... 525/63
(58) Field of Search ........................................... 525/63

(56) References Cited

U.S. PATENT DOCUMENTS 4,117,034 A * 9/1978 Steffancin .................... 525/64

FOREIGN PATENT DOCUMENTS

| JP | 52-027456 | 3/1977 |
|----|-----------|--------|
| JP | 63-258946 | 10/1988 |
| JP | 2-281065 | 11/1990 |
| JP | 5-214228 | 8/1993 |
| JP | 6-65331 | 3/1994 |

* cited by examiner

Primary Examiner—Terressa M. Boykin
(74) Attorney, Agent, or Firm—Oblon, Spivak, McClelland, Maier & Neustadt, P.C.

(57) ABSTRACT

The present invention provides a resin composition comprising 50 to 99 percent by weight of a completely amorphous polyester resin (A), and 1 to 50 percent by weight of a graft copolymer (B) obtained by graft-polymerizing a methacrylic acid ester and a vinyl aromatic compound with conjugated diene rubber particles and/or a graft copolymer (C) obtained by graft-polymerizing a methacrylic acid ester and a vinyl aromatic compound with acrylic rubber particles. According to the present invention, a resin composition and a resin sheet specifically suitable for membrane pressing, vacuum pressing, air pressing, and the like are provided, in which the resin composition and the resin sheet have superior properties, such as workability, moldability, impact resistance, transparency, and the like. In addition, plate-out is not significantly observed and whitening during embossing and heat-sealing is unlikely to occur.

6 Claims, 2 Drawing Sheets

V-CUT FORMATION

RESIN COMPOSITION AND RESIN SHEET

TECHNICAL FIELD

The present invention relates to resin compositions and resin sheets.

BACKGROUND ART

Conventionally, laminated decorative sheets have been widely used for adhering to metal or wooden materials used for furniture, cabinets, fixtures, desks, cupboards, and the like.

Laminated decorative sheets have also been singly or as laminated decorative sheets formed by laminating a plurality of sheets, e.g., an upper sheet, an under sheet, and in addition, an intermediate sheet.

In addition, laminated decorative sheets are also precisely adhered by membrane pressing onto adherends having complicated curved surfaces.

As a conventional laminated decorative sheet, there is a sheet disclosed in, for example, Japanese Patent Laid-Open No. 7-24979. The sheet mentioned above is a laminated decorative sheet composed of an opaque polyolefin resin film as a substrate layer and an amorphous polyethylene terephthalate resin film.

In this connection, the amorphous polyethylene terephthalate resin film used for the sheet disclosed in Japanese Patent Laid-Open No. 7-24979 is called "amorphous". However, there is some partial crystallinity in the resin film.

Further, a rigid shrinkable film is disclosed, in Japanese Patent Laid-Open No. 62-124928. This film includes an amorphous polyester resin component and a polymer component composed of a vinyl aromatic hydrocarbon, in which the polymer component comprises at least one polymeric block segment primarily composed of the vinyl aromatic hydrocarbons mentioned above and at least one polymeric block segment primarily composed of conjugated diene derivatives.

According to the conventional technique described above, a laminated decorative sheet and a rigid shrinkable film having superior moldability impact resistance, and the like can be obtained.

In addition, in Japanese Patent Laid-Open No. 2-129266, an agent for improving impact resistance of polyalkylene terephthalate resins is disclosed. This is a resin composition composed of a polyalkylene terephthalate resin, such as polybutylene terephthalate and polyethylene terephthalate, and a core-shell polymer composed of a rubber elastomer as a core and a glassy polymer as a shell.

According to the conventional technique mentioned above, a resin composition having superior impact resistance can be obtained.

However, conventional resin compositions and laminated decorative sheets have problems in that whitening occurs during embossing, heat-sealing, and bending in fabrication, and the degree of transparency is poor. Furthermore, there is a problem in that plate-out occurs during roller molding (calendering and embossing) or injection molding.

Conventionally, in addition to resin sheets having transparency, resin sheets having colored or printed under sheets are also widely used. In this case, in order to provide deeper design effects to the resin sheets, transparent sheets are generally used as upper sheets. However, the design effects have not reached a satisfactory level. In addition, resin sheets having colored or printed sheets used as a single sheet or used as an upper sheet have problems with regard to workability since whitening is likely to occur during bending.

An object of the present invention is to provide a resin composition and a resin sheet specifically suitable for membrane pressing, vacuum pressing, air pressing, and the like, in which the resin composition and the resin sheet have superior properties, such as workability, moldability, impact resistance, transparency, and the like, and in which plate-out is not significantly observed, and whitening during embossing and heat-sealing is unlikely to occur.

Membrane pressing is pressing comprising the steps of heating a thermoplastic decorative sheet having a desired colored or surface-printing, and a desired thickness to a temperature close to the softening point thereof, covering the decorative sheet on an adherend having complicated curved surfaces such as doors used in integrated kitchen systems, covering an elastic membrane (in the form of a film), for example, a rubber film, on the decorative sheet, and adhering the decorative sheet onto the adherend precisely along the contour thereof by applying air or hydraulic pressure to the elastic membrane.

The basic principles of vacuum pressing and air pressing are equivalent to that of membrane pressing. The former is pressing using vacuum pressure instead of a pressing rubber membrane, and the latter is pressing using air pressure.

SUMMARY OF INVENTION

Through intensive research by the inventors of the present invention, the conventional problems described above can be solved.

That is, the present invention provides a resin composition comprising 50 to 99 percent by weight of a completely amorphous polyester resin (A) and 1 to 50 percent by weight of a graft copolymer (B) obtained by graft-polymerizing a methacrylic acid ester and a vinyl aromatic compound with conjugated diene rubber particles.

The present invention provides a resin composition comprising 50 to 99 percent by weight of the completely amorphous polyester resin (A) and 1 to 50 percent by weight of a graft copolymer (C) obtained by graft-polymerizing a methacrylic acid ester and a vinyl aromatic compound with acrylic rubber particles.

The present invention also provides a resin composition comprising 50 to 98 percent by weight of the completely amorphous polyester resin (A), 1 to 49 percent by weight of the (B) graft copolymer obtained by graft-polymerizing a methacrylic acid ester with conjugated diene rubber particles, and 1 to 49 percent by weight of the graft copolymer (C) obtained by graft-polymerizing a methacrylic acid ester and a vinyl aromatic compound with acrylic rubber particles, wherein the total of the (A), (B), and (C) is 100 percent by weight.

In addition, the present invention provides a resin sheet obtained by molding a resin composition comprising 50 to 99.9 percent by weight of the completely amorphous polyester resin (A) and 0.1 to 50 percent by weight of a thermoplastic polyester elastomer (D).

The present invention also provides a resin sheet that is colored and/or is printed on a surface thereof.

The present invention further provides a laminated resin sheet obtained by laminating at least two layers of the resin sheet described above.

The present invention also provides a laminated resin sheet obtained by laminating two layers, in which the resin sheet described above is used as an upper layer and a thermoplastic resin (F) sheet is used as an under layer.

Additionally, the present invention provides a laminated resin sheet obtained by laminating two layers, in which the resin sheet described above is used as an upper layer and a resin sheet, which comprises 50 to 99 percent by weight of the completely amorphous polyester resin (A), 1 to 50 percent by weight of the (B) graft copolymer obtained by graft-polymerizing a methacrylic acid ester and a vinyl aromatic compound with conjugated rubber particles and/or the graft copolymer (C) obtained by graft-polymerizing a methacrylic acid ester and a vinyl aromatic compound with acrylic rubber particles, is used a colored and/or printed surface under layer.

The present invention also provides a resin composition comprising 50 to 99 percent by weight of the components (A)+(E) composed of 0.1 to 95 percent by weight of the completely amorphous polyester resin (A) and 5 to 99.9 percent by weight of the polyester resin (E) in which the degree of crystallinity thereof is nearly zero to 50%, and 1 to 50% of at least one selected from the group consisting of the (B) graft copolymer obtained by graft-polymerizing a methacrylic acid ester and a vinyl aromatic compound with conjugated diene rubber particles, the graft copolymer (C) obtained by graft-polymerizing a methacrylic acid ester and a vinyl aromatic compound with acrylic rubber particles, and the thermoplastic elastomer (D).

The present invention further provides a resin sheet obtained by molding a resin composition described above.

DISCLOSURE OF INVENTION

Component (A) (completely amorphous polyester resin)

The completely amorphous polyester resin (A) used for the present invention is a resin showing no degradation in properties by recrystallization through repeated heat treatment and having no crystalline component at all therein. In this connection, the term "crystallinity" used in the present invention is crystallinity as measured by a differential scanning calorimetric (DSC) method (Japanese Industrial Standard (JIS) K7121).

The completely amorphous polyester resin (A) which are preferably used are produced by polycondensation through esterification, for example, primarily between terephthalic acid or dimethyl terephthalic acid and ethylene glycol.

The completely amorphous polyester resin (A) comprises a copolymer formed by copolymerizing a third component in addition to the dicarboxylic acid component and the glycol component, and the type mentioned above is preferably used for the present invention.

In a preferable embodiment of the present invention, as the third component, 1,4-cyclohexane dimethanol, terephthalic acid, isophthalic acid, and the like are preferable, and a glycol component composed of at least two compounds are more preferable. A completely amorphous polyester resin composed of a dicarboxylic acid component comprising terephthalic acid and a diol component comprising 50 to 99 mole percent of ethylene glycol and 1 to 50 mole percent of 1,4-cyclohexane dimethanol is most preferable. Among these, it is specifically preferable that a completely amorphous polyester resin be composed of a dicarboxylic acid component comprising terephthalic acid and a diol component comprising 60 to 80 mole percent of ethylene glycol and 20 to 40 mole percent of 1,4-cyclohexane dimethanol.

In addition, viscosity of the component (A) is preferably 0.65 to 0.85 as an intrinsic viscosity (IV) value.

A method for producing completely amorphous polyester resins has been well known in the art and is disclosed in, for example, U.S. Pat. No. 5,340,907.

The resin compositions of the present invention can be obtained by blending the completely amorphous polyester resin component (A) with the (B) graft copolymer produced by graft-polymerizing a methacrylic acid ester and a vinyl aromatic compound with conjugated diene rubber particles, by blending the completely amorphous polyester resin (A) component with the graft copolymer (C) produced by graft-polymerizing a methacrylic acid ester with acrylic rubber particles, or by blending the completely amorphous polyester resin (A) component with the (B) graft copolymer and the graft copolymer (C). That is, the resin composition of the present invention can use two types of graft copolymers. Hereinafter, the two graft copolymers will be described.

Graft copolymer (B)

The graft copolymer (B) is obtained by graft-polymerizing a methacrylic acid ester and a vinyl aromatic compound with conjugated diene rubber particles.

Conjugated dienes used for preparing the conjugated diene rubber particles are olefins having conjugated double bonds, such as 1,3-butadiene, 2-methyl-1,3-butadiene, 2,3-dimethyl-1,3-butadiene, 1,3-pentadiene, and 1,3-hexadiene.

The conjugated diene rubber particles are prepared by polymerizing the conjugated dienes mentioned above, and in addition, the conjugated diene rubber particles may be prepared by copolymerizing the conjugated dienes mentioned above with vinyl aromatic compounds or other copolymerizable monomers. Vinyl aromatic compounds used for copolymerization mentioned above are styrene, α-methyl styrene, α-ethyl styrene, and substituted derivatives thereof such as vinyltoluene, isopropenyl toluene, chlorostyrene, vinylidene aromatic compounds, and the like. Other copolymerizable monomers are alkyl acrylates, such as methyl acrylate, ethyl acrylate, and butyl acrylate; vinyl cyanides, such as acrylonitrile and methacrylonitrile; vinylidene cyanides; and the like.

Furthermore, a cross-linking agent may be used for cross-linking. Cross-linkable monomers used for cross-linking are monomers having at least two double bonds having reactivities equivalent to each other, for example, divinyl aromatic monomers such as divinylbenzene; and alkanepolyol polyacrylates, such as ethyleneglycol dimethacrylate, butyleneglycol dimethacrylate, hexanediol dimethacrylate, oligo-ethyleneglycol dimethacrylates, trimethylol propanedimethacrylate, and trimethylol propanetrimethacrylate. Specifically, butyleneglycol diacrylate and hexanediol diacrylate are preferably used.

The conjugated diene rubber particles are preferably composed of 1 to 65 percent by weight of a conjugated diene, 0 to 35 percent by weight of a vinyl aromatic compound, and 0 to 35 percent by weight of other copolymerizable monomer. In this connection, a small amount of a cross-linking agent is used, and a specific amount thereof is appropriately selected.

Polymerization of the conjugated diene rubber particles can be performed by a known polymerization method, and is not specifically limited.

The particle diameter of the resultant conjugated diene rubber particles is preferably 0.05 to 1.0 μm. More preferably, the particle diameter thereof is 0.05 to 0.5 μm.

Next, the graft copolymer (B) is prepared by graft-polymerizing a methacrylic acid ester and a vinyl aromatic compound with the conjugated diene rubber particles. The methacrylic acid esters preferably have 1 to 8 carbon atoms, for example, methyl methacrylate, ethyl methacrylate, propyl methacrylate, butyl methacrylate, cyclohexyl methacrylate, and 2-ethylhexyl methacrylate. The methacrylic acid esters mentioned above may also be used in combination. Specifically, methyl methacrylate is preferably used. As the vinyl aromatic compounds mentioned above, those mentioned above by way of example can be used.

When a methacrylic acid ester and a vinyl aromatic compound are graft-copolymerized, when necessary, other components, that is, other copolymerizable monomers and cross-linking agents, and the like can also be copolymerized therewith. As the copolymerizable monomers and the cross-linking agents, those mentioned above by way of example can. be used. However, a ratio of these other components to the total weight of the methacrylic acid ester, the vinyl aromatic compound, and the other components is preferably less than 50 percent by weight.

A copolymerization reaction of conjugated diene rubber particles with methacrylic acid esters, vinyl aromatic compounds, and other components used when necessary, can be performed using known methods, and the methods therefor are not specifically limited. For example, seed emulsion polymerization or the like can be used.

A ratio of the conjugated diene rubber particles in the graft copolymer (B) is preferably 40 to 90 percent by weight.

Graft copolymer (C)

The graft copolymer (C) is obtained by graft-polymerizing a methacrylic acid ester and a vinyl aromatic compound with acrylic rubber particles.

The acrylic rubber particles are obtained by polymerizing an acrylic acid ester. The acrylic esters, which preferably have 2 to 8 carbon atoms in an alcohol component, are, for example, ethyl acrylate, propyl acrylate, butyl acrylate, cyclohexyl acrylate, and 2-ethylhexyl acrylate.

The acrylic rubber particles are prepared by polymerizing the acrylic esters mentioned above, and in addition, may be prepared by copolymerizing the acrylic esters with vinyl aromatic compounds and other copolymerizable monomers. Furthermore, a cross-linking agent may be used for cross-linking. Examples of these vinyl aromatic compounds, other copolymerizable monomers, and cross-linking agents are mentioned in the description of the graft copolymer (B).

The acrylic rubber particles are preferably composed of 1 to 65 percent by weight of an acrylic ester, 0 to 35 percent by weight of a vinyl aromatic compound, and 0 to 35 percent by weight of other copolymerizable monomers. In this connection, a small amount of a cross-linking agent is used, and a specific amount thereof is appropriately selected.

Polymerization of the acrylic rubber particles can be implemented by known polymerization methods, and the methods are not specifically limited.

The particle diameter of the resultant acrylic rubber particles is preferably 0.05 to 1.0 μm. More preferably, the particle diameter is 0.05 to 0.5 μm.

Next, the graft copolymer (C) is prepared by graft-polymerizing a methacrylic acid ester and a vinyl aromatic compound with the acrylic rubber particles. The methacrylic acid esters preferably have 1 to 8 carbon atoms, and those mentioned in the description of the graft copolymer (B) are exemplified. The vinyl aromatic compounds are exemplified by those mentioned in the description of the graft copolymer (B).

When a methacrylic acid ester is graft-polymerized, when necessary, other components, that is, other copolymerizable monomers and a cross-linking agents, and the like can be copolymerized with the methacrylic acid ester. The copolymerizable monomers and the cross-linking agents mentioned above by way of example can be used. However, the ratio of these other components to the total weight of the methacrylic acid ester and the other components is preferably less than 50 percent by weight.

A copolymerization reaction of acrylic rubber particles with a methacrylic acid ester, a vinyl aromatic compound, and other components used when necessary can be performed using a known method, and the method therefore is not specifically limited. For example, seed emulsion polymerization or the like can be used.

A ratio of the acrylic rubber particles in the graft copolymer (C) is preferably 40 to 90 percent by weight.

Glass transition temperatures of the graft components in the graft copolymer (B) and the graft copolymer (C) are preferably 40° C. or above.

The resin composition of the present invention is composed of 50 to 99 percent by weight of the completely amorphous polyester resin (A) and 1 to 50 percent by weight of the graft copolymer (B), and is preferably composed of 55 to 92 percent by weight of the completely amorphous polyester resin (A) and 8 to 45 percent by weight of the graft copolymer (B).

In the case in which the graft copolymer (C) is used, the resin composition is composed of 50 to 99 percent by weight of the completely amorphous polyester resin (A) and 1 to 50 weight percent by weight of the graft copolymer (C), and is preferably composed of 55 to 92 percent by weight of the completely amorphous polyester resin (A) and 8 to 45 weight percent by weight of the graft copolymer (C).

In addition, in the case in which the graft copolymers (B) and (C) are both used, the resin composition is preferably composed of 50 to 98 percent by weight of the completely amorphous polyester resin (A), 1 to 49 percent by weight of the graft copolymer (B), and 1 to 49 weight percent by weight of the graft copolymer (C), wherein the total of (A), (B), and (C) is 100 percent by weight.

The present invention provides a resin sheet obtained by molding a composition comprising 50 to 99.9 percent by weight of the completely amorphous polyester resin (A) and 0.1 to 50 percent by weight of a thermoplastic polyester elastomer (D).

As the thermoplastic polyester elastomer (D), by way of example, there is a segment copolyester having a molecular weight of 5,000 to 100,000 preferably composed of, for example, hard segments of terephthalic crystalline polyesters (polybutylene terephthalate (PBT) or polybutylene naphthalate (PBN)) represented by the general formula (1) or (2), and soft segments of aliphatic polyethers having a molecular weight of 600 to 6,000 (polytetramethylene diglycol (PTMG), polypropylene glycol (PPG), and polyethylene glycol (PEG)) represented by the general formula (3) in which x is an integer of 2 to 4, and p is an integer of 8 to 140.

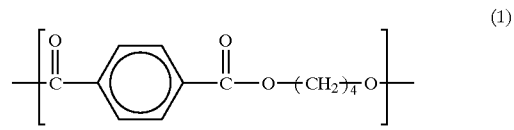

(1)

-continued

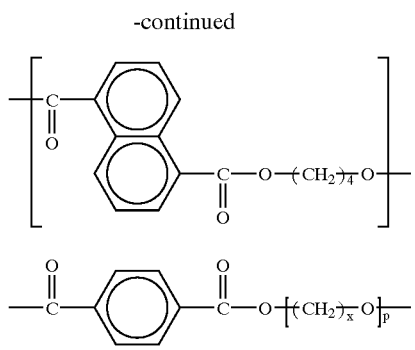

By setting the molecular weight of the thermoplastic polyester elastomer (D) to be in the range described above, properties of the resultant resin sheet, such as impact resistance, tensile strength, low temperature resistance, and moldability, can be further improved.

By appropriately selecting the molar ratio of the hard segments to the soft segments, desired properties such as impact resistance of the resin sheet of the present invention can be obtained.

For example, concerning the molar ratio of hard segments to soft segments, 50 mole percent or more of the soft segments is preferable.

Copolymers are composed of, for example, an aromatic polyester as a hard component and an aliphatic polyether as a soft component, an aromatic polyester as a hard component and an aliphatic polyester (for example, aliphatic lactonic elastomer) as a soft component, and polybutylene naphthalate as a hard component and an aliphatic polyether as a soft component.

The composition of the component (A) and the component (D) is 50 to 99.9 percent by weight of the component (A) and 0.1 to 50 percent by weight, preferably, 0.5 to 30 percent by weight of the component (D). More preferably, the component (D) is 1 to 30 percent by weight.

When the component (D) is 0.1 percent by weight or less, the mechanical strength is poor, and when the component (D) exceeds 50 percent by weight, molding workability is poor due to poor separation thereof from rollers.

A composition obtained by blending the component (A) and component (D) can be molded into a sheet, and the resultant sheet can be used as a monolayer resin sheet (hereinafter referred to as transparent resin sheet). The transparent resin sheet thus obtained has superior mechanical strength and transparency, is unlikely to whiten, and is superior in facilitating design. The transparent sheet can be colored using a known method, and/or the surfaces thereof may be printed.

As examples of the laminated resin sheets of the present invention, there are laminated resin sheets formed by laminating at least two transparent sheets, laminated resin sheets formed by laminating at least two transparent sheets which are colored and/or have printed surfaces, and laminated resin sheets formed by laminating a transparent resin sheet as an upper layer over a sheet with colored and/or printed surfaces as an under layer. In addition, it will be readily understood that, when necessary, various intermediate layers can be used, and this example is within the scope of the present invention.

Furthermore, a sheet composed of a thermoplastic resin (F) described below can be applied to the laminated resin sheet of the present invention as an under layer.

The thermoplastic resins used for the present invention are, in general, polyvinyl chlorides, polyolefins (polyethylenes, polypropylenes, propylene-ethylene copolymers), methacrylic acid esters, polycarbonate resins, polystyrene resins, acryl-styrene (AS) resins, acryl-butadiene-styrene (ABS) resins, polyester resins, polyurethane resins, polyamide resins, and the like. The component (F) can also be molded into a sheet by a method described below. When the component (F) is used as an under layer, an upper layer is preferably a transparent resin sheet or a resin sheet which is colored and/or ha printed surfaces since whitening does not occur in the upper layer even though the lower layer whitens, whitening cannot be seen from the surface.

Furthermore, in the present invention, a sheet can be used as an under layer formed of a composition having the component (A) and the graft copolymer (B) and/or the graft copolymer (C), which are described above.

As described above, it is preferable when an under layer formed of the composition having the component (B) and/or the (C) component is used in addition to the component (A), since advantages of improved mechanical strength and superior V-cut properties can be obtained.

In addition, when the sheet of the present invention is used for building materials, specifically, when it is used at a place where detergents are often used, such as in a kitchen, it is preferable to blend a polyester resin (E) described below with the composition since stress-cracking resistance can be improved.

The polyester resin (E) has a degree of crystallinity of nearly 0% to 50%, and in particular, has the formula shown below. Specifically, the polyester resin (E) may be, for example, a glycol modified polycyclohexylene dimethylene terephthalate (PCTG) composed of 100 mole percent of terephthalic acid, 42 to 32 mole percent of ethylene glycol, and 58 to 68 mole percent of 1,4-cyclohexane dimethanol; an acid modified polycyclohexylene dimethylene terephthalate (PCTA) composed of 1 to 50 mole percent of isophthalic acid and 50 to 99 mole percent of terephthalic acid as a dicarboxylic acid component, and preferably composed of 1 to 25 mole percent of isophthalic acid and 75 to 99 mole percent of terephthalic acid; and the like. As examples of PCTAs, there is a copolyester 1 composed of 80 mole percent of terephthalic acid, 20 mole percent of isophthalic acid, and 100 mole percent of 1,4-cyclohexane dimethanol; and a copolyester 2 composed of 95 mole percent of terephthalic acid, 5 mole percent of isophthalic acid, and 100 mole percent of 1,4-cyclohexane dimethanol.

PCTG:

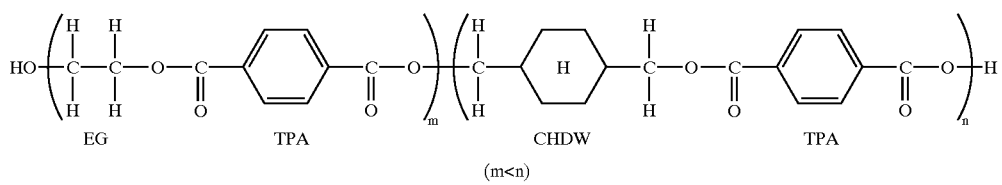

PCTA:

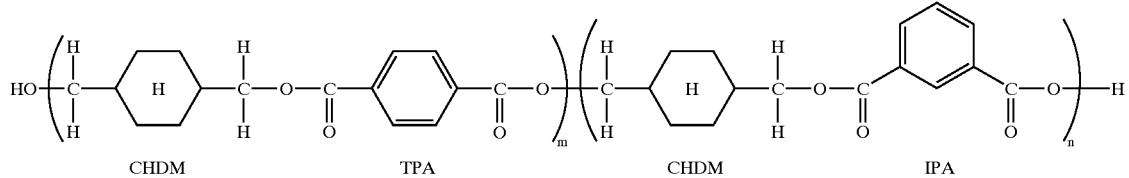

In addition, polyethylene terephthalate derivatives shown by the following formulas are also preferable.

PET

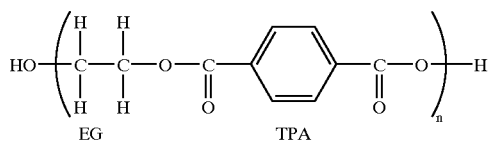

PET:

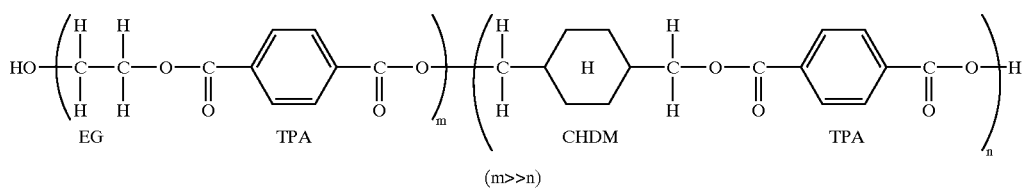

(m>>n)

EG: Ethylene glycol
CHDM: Cyclohexanedimethanol
TPA: Terephthalic acid
IPA: Isophthalic acid Heat of fusion of the component (E) observed by a DSC method (JIS K7121) is not more than 15 cal/g, preferably not more than 10 cal/g, and more preferably not more than 7 cal/g. In addition, viscosity of the component (E) is preferably 0.65 to 0.85 as an IV value. Furthermore, at least two types of components (E) may be used in combination.

The resin composition formed with the component (E) of the present invention comprises 50 to 99 percent by weight of the components (A)+(E) composed of 0.1 to 95 percent by weight of the completely amorphous polyester resin (A) and 5 to 99.9 percent by weight of the component (E), and 1 to 50 percent by weight of at least one selected from the group consisting of the graft copolymer (B) obtained by graft-polymerizing a methacrylic acid ester and a vinyl aromatic compound with conjugated diene rubber particles, the graft copolymer (C) obtained by graft-polymerizing a methacrylic acid ester and a vinyl aromatic compound with acrylic rubber particles, and the thermoplastic polyester elastomer (D).

In a preferable embodiment, the resin composition formed with the component (E) of the present invention comprises 70 to 93 percent by weight of the components (A) and (E) composed of 20 to 93 percent by weight of the completely amorphous polyester resin (A) and 7 to 80 percent by weight of the component (E), and 7 to 30 percent by weight of at least one selected from the group consisting of the graft copolymer (B) obtained by graft-polymerizing a methacrylic acid ester and a vinyl aromatic compound with conjugated diene rubber particles, the graft copolymer (C) obtained by graft-polymerizing a methacrylic acid ester and a vinyl aromatic compound with acrylic rubber particles, and the thermoplastic polyester elastomer (D). The resin composition formed with the component (E) of the present invention has a smaller ratio of the component (A) compared to the resin compositions described above. The reason for this is that the primary object of the composition is to obtain stress-cracking resistance. In other words, when sheet properties other than stress-cracking resistance are not specifically desired, the component (A) may be set to be 0.1 to 95 percent by weight.

The components (A), (B), (C), and (D) are as described above.

The various resin compositions described above may also include appropriate amounts of additives.

As the additives mentioned above, there may be mentioned, for example, flame retardants, mold release agents, weather-resistant agents, antioxidation agents, antistatic agents, heat stabilizers, lubricants, coloring agents, surfactants, reinforcing agents, and fillers. In this connection, lubricants are preferably blended in order to improve workability. Materials mentioned below can be used as lubricants, that is, hydrocarbons (low molecular weight polyethylene and paraffins), fatty acids (stearic acid, hydroxy stearic acid, stearic acid composites, and oleic acid), aliphatic alcohols, aliphatic amides (stearoamides, oxystearic amides, oleic amides, erucic amides, ricinoleic amides, behenic amides, methylol amides, methylene bis-stearoamides, methylene bis-stearo behenic amides, bisamides of higher fatty acids, stearoamides, and amide composites), aliphatic esters (n-butyl stearate, methylhydroxy stearate, fatty acid polyols, saturated fatty esters, and ester waxes), and fatty acidic metal soaps. A Hydrocarbons and aliphatic esters are preferable, and aliphatic esters are more preferable.

The resin composition of the present invention can be obtained by kneading a composition thus obtained using a Banbury mixer, or a single or double shaft kneader.

The resin composition of the present invention can be formed into a sheet having a desired size and thickness by a calendering machine, a T-die extruder, and the like. It is difficult for whitening to occur in the resultant sheet during embossing or heat-sealing, and the sheet is specifically suitable for vacuum pressing, air pressing, and membrane pressing, and it can be used as, for example, various laminated decorative sheets.

The thickness of the resin sheet or the laminated resin sheet of the present invention is not specifically limited. However, the transparent resin sheet may be 5 to 1,000 $\mu$m, preferably 60 to 500 $\mu$m thick. In the case of the laminated resin sheet, an upper layer is 5 to 1,000 $\mu$m thick, preferably 60 to 500 $\mu$m, an under layer is 5 to 1,000 $\mu$m thick, preferably 60 to 500 $\mu$m, and the overall laminated sheet is 10 to 2,000 $\mu$m thick, preferably, 120 to 1,000 $\mu$m.

BEST MODE FOR CARRYING OUT THE INVENTION

Figure 1:
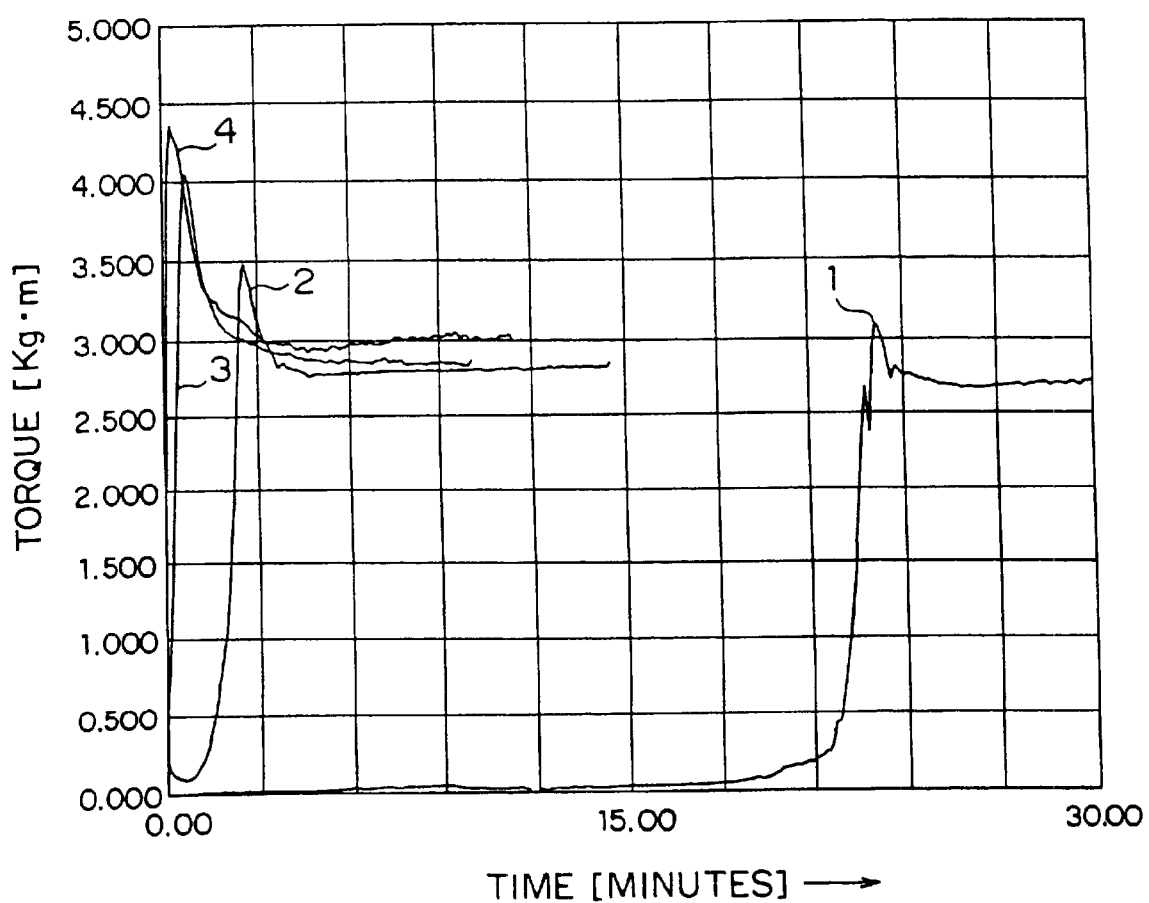
FIG. 1 is a graph showing the results of measuring the kneading torques of resin compositions in mills for examples 3, 4, 8, and 9.

Hereinafter, the present invention will be described with reference to examples. However, the present invention is not limited to examples.

EXAMPLES 1 TO 17

Measurement Methods for Various Properties will be Described (1) Roller Workability Test Workability was evaluated by kneading a composition using an 8-inch testing roller apparatus at a surface temperature of 190° C.

○: Kneading operation can be performed without problems, and a sheet can be produced.

Δ: A sheet can be produced, however, operation is difficult due to occurrence of adhesion.

x: Crystallization occurs, whitening occurs in sheets, and a product cannot be produced.

(2) Mold Contamination Test

A resin composition (pellets) was injection-molded under the following conditions to form a resin plate 150 mm long, 25 mm wide, and 4 mm thick. Releasing properties were evaluated by releasing the molded part from a mold.

Nissei Plastic Industrial Co., Ltd. FS-120
Molding temperature: 250° C., 260° C., and 280° C.
Injection speed: 55 mm/second
Injection pressure: 800 kg/cm$^2$
Holding pressure: 600 kg/cm$^2$
Injection time: 8 seconds
Cooling time: 45 seconds (3) Plate-out Test During the roller test, metal surfaces of the rollers were observed every 5 minutes.

(4) Izod Impact Test

Testing method was in accordance with JIS K7110.

A test piece 6.35 mm long, 12.7 mm wide, and 6.4 mm thick (provided with a notch) was prepared by injection molding, and evaluated.

(5) Tensile Strength and Elongation

Testing method was in accordance with JIS K7113.

No. 1 dumbbell specimens 1.0 mm thick were prepared by injection molding. The dumbbell specimens were evaluated at a temperature of 23° C. and at a relative humidity of 50% (before acceleration test) and after aging for 7 days at a temperature of 60° C. and relative humidity of 95% (after acceleration test).

(6) V-cut Test

A predetermined amount of a resin composition was processed by calendering and formed into a film 0.2 mm thick. After holding the film at 60° C. at 95% relative humidity for 7 days, the film was laminated on a medium density fiberboard (MDF) by the following method. That is, after coating 140 g/mm$^2$ of a two-component curable adhesive agent primarily composed of an ethylene-vinyl acetate copolymer on a 240 mm long, 1,200 mm wide, and 18 mm thick MDF with water absorption of 5 to 15% (Starwood, Hokushin Co., Ltd.), the film was laminated thereon and subsequently pressed and aged at a pressure of 1 to 5 kg/cm$^2$ for approximately 12 hours.

Figure 2:
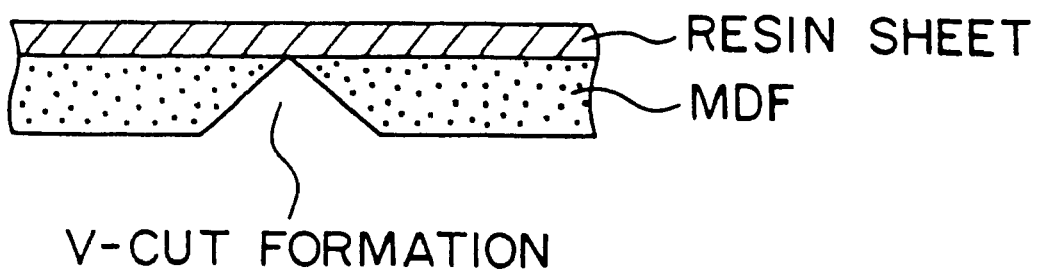
FIG. 2 shows a resin sheet of the present invention laminated on an MDF (medium density fiberboard) provided with a V-cut.
Figure 3:
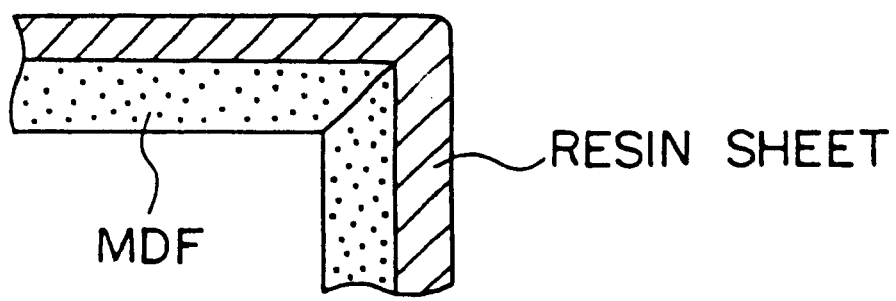
FIG. 3 shows a state in which a resin sheet of the present invention laminated on an MDF provided with a V-cut is bent at right angles.

The MDF provided with the film was cut to a size 600 mm long and 400 mm wide, and a V-cut having an open angle of 90° was formed along the width direction at the center point in the longitudinal direction of the MDF as shown in FIG. 2. The MDF provided with the film was then bent at a temperature of 23±2° C. and a bending rate of 1 mm/minute, to form a right angle shape as shown in FIG. 3.

The appearance of the bent portion was observed. No change is represented by ○, and occurrence of cracking is represented by x.

In the following examples, some of the various resins listed below were used.

(1) Completely Amorphous Polyester Resin (A)
Manufacturing company: Eastman Chemical Co.
Trade name: KODAR PETG 6763 (PET-G)
Composition: copolymer type
Glycol component: 70 mole percent of ethylene glycol and 30 mole percent of 1,4-cyclohexane dimethanol
Dicarboxylic component: terephthalic acid
Crystallinity: 0%
Heat of fusion: Not measurable due to a completely amorphous structure (2) Amorphous Polyester Resin
Manufacturing company: Unitika, Ltd.
Trade name: MA-2101 (A-PET)
Composition: homopolymer type
Glycol component: ethylene glycol
Dicarboxylic component: terephthalic acid
Crystallinity: partial (3) Graft Copolymer (B)
(i)
Manufacturing company: Kaneka Corp.
Trade name: Kaneace B-28
Composition: methacrylic acid ester.styrene/styrene.butadiene rubber graft copolymer
Rubber particle diameter: 0.1 to 0.5 $\mu$m (ii)
Manufacturing company: Kaneka Corp.
Trade name: Kaneace B-56
Composition: methacrylic acid ester.styrene/butadiene rubber graft copolymer
Rubber particle diameter: 0.1 to 0.5 $\mu$m (4) Graft Copolymer (C)
Manufacturing company: Kaneka Corp.
Trade name: Kaneace FM
Composition: methacrylic acid ester.acrylonitrile/butyl acrylate (acrylic rubber) graft copolymer Rubber particle diameter: 0.05 to 0.1 μm
(5) Other Polymer
(i)
  Manufacturing company: Asahi Chemistry Industry Co., Ltd.
  Trade name: Asaflex 810
  Composition: styrene/butadiene block copolymer
  Styrene content 78%
  Number average molecular weight 130,000
(ii)
  Manufacturing company: Asahi Chemistry Industry Co., Ltd.
  Trade name: Toughprene 125
  Composition: styrene/butadiene block copolymer
  Styrene content 40%
  Number average molecular weight 80,000
(4) Additive
(i)
  Manufacturing company: Ishihara Sangyo Kaisha, Ltd.
  Trade name: CR90
  Composition: rutile titanium oxide
(ii)
  Manufacturing company: Mitsui Chemicals, Inc.
  Trade name: W-4051
  Composition: oxidized polyethylene wax The test results obtained are shown in Tables 1 and 2.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| PET-G | Completely amorphous PET | 60 | 80 | 90 | 95 | 80 | 80 | 80 | 99 | 100 |
| A-PET | Amorphous PET | | | | | | | | | |
| B-28 | MBS(MS-SBR) | | | | | | 20 | | | |
| B-56 | MBS(MS-BR) | 40 | 20 | 10 | 5 | | | 20 | 1 | |
| FM | MAS(MS-AR) | | | | | 20 | | | | |
| Asaflex810 | SBS(St:78%) | | | | | | | | | |
| Toughprene125 | SBS(St:40%) | | | | | | | | | |
| CR90 | Pigment | | | | | | | 10 | | |
| W-4051 | Polyethylene wax | 2 | 3 | 3 | 3 | 3 | 3 | 3 | 3 | 3 |
| Roller workability | | ○ | ○ | ○ | ○ | ○ | ○ | ○ | ○ | ○ |
| Mold contamination | | No | No | No | No | No | No | No | No | No |
| Plate-out (after 30 min.) | | No plate-out | No plate-out | No plate-out | No plate-out | No plate-out | No plate-out | No plate-out | No plate-out | No plate-out |
| Izod impact value | KJ/m$^3$ | 88 | 86 | 83 | 10 | 35 | 30 | 89 | 5.5 | 5 |
| Tensile impact strength | Kgf/mm$^2$ | 1.9 | 2.7 | 3.9 | 4.2 | 2.7 | 2.7 | 2.6 | 4.4 | 4.5 |
| Tensile elongation (before acceleration test) | % | 260 | 280 | 290 | 280 | 260 | 240 | 290 | 290 | 300 |
| Tensile elongation (after acceleration test) | % | — | — | 275 | — | — | — | — | — | 0 |
| V-cut test | | | | ○ | | | | | | x |

TABLE 2

| | | Example 10 | Example 11 | Example 12 | Example 13 | Example 14 | Example 15 | Example 16 | Example 17 |
|---|---|---|---|---|---|---|---|---|---|
| PET-G | Completely amorphous PET | | | 80 | 80 | 90 | 95 | 80 | 90 |
| A-PET | Amorphous PET | 100 | 90 | | | | | | |
| B-28 | MBS(MS-SBR) | | | | | | | | |
| B-56 | MBS(MS-BR) | | 10 | | | | | | |
| FM | MAS(MS-AR) | | | | | | | | |
| Asaflex810 | SBS(St:78%) | | | 20 | 20 | 10 | 5 | | |
| Toughprene125 | SBS(St:40%) | | | | | | | 20 | 10 |
| CR90 | Pigment | | | | 10 | | | | |
| W-4051 | Polyethylene wax | 3 | 3 | 3 | 3 | 3 | 3 | 3 | 3 |
| Roller workability | | x Crystallization | x Crystallization | Δ | Δ | Δ | Δ | Δ | Δ |
| Mold contamination | | No | — | Yes | Yes | Yes | Yes | Yes | Yes |

TABLE 2-continued

|  | | Example 10 | Example 11 | Example 12 | Example 13 | Example 14 | Example 15 | Example 16 | Example 17 |
|---|---|---|---|---|---|---|---|---|---|
| Plate-out (after 30 min.) | | — | — | 5 min. after kneading deposit on roller | Remarkable white deposit | 5 min. after kneading, deposit on roller | 5 min. after kneading, deposit on roller | 5 min. after kneading, deposit on roller | 5 min. after kneading, deposit on roller |
| Izod impact value | KJ/m² | — | — | 33 | — | 25 | 7 | 93 | 64 |
| Tensile impact strength | Kgf/mm² | — | — | 3.8 | — | 4.7 | 4.9 | 2.3 | 3.7 |
| Tensile elongation (before acceleration test) | % | — | — | 317 | — | 317 | 334 | 284 | 272 |
| Tensile elongation (after acceleration test) | % | — | — | — | — | 0 | — | — | — |
| V-cut teet | | | | | | x | | | |

As can be seen from the Tables above, the resin compositions of the present invention were superior in various properties; however, the compositions (examples 10 and 11) using common amorphous polyester resins instead of the completely amorphous polyester resins were noticeably inferior in roller workability. In addition, the compositions (examples 12 to 17) having a polymer other than the graft copolymers (B) and (C) had superior properties; however, they were inferior in roller workability, mold contamination, and plate-out. In the composition (example 9) having only the completely amorphous polyester resin as a polymer component, adequate properties could be obtained.

In addition, kneading torques of the resin compositions in a mill for examples 3, 4, 8, and 9 were measured. The measurement conditions are shown below.
  Mixer: Lab-plastomill R-30 type by Toyo Seiki Co., Ltd.
  Amount of sample: 33 grass
  Test temperature: 160° C.
  Test revolutions: 50.0 rpm
  Pre-heating time: 120 seconds The results obtained are shown in FIG. 1. In FIG. 1, #1 is for example 9, #2 is for example 8, #3 is for example 4, and #4 is for example 3. According to FIG. 1, the torque values of the resin compositions of the present invention increased in a short time and gelation thereof rapidly occurred; however, gelation of the resin composition for the sample 9 was delayed approximately 20 minutes. Accordingly, differences in workability between two types of resin compositions was apparent. That is, the resin compositions of the present invention were readily melted by kneading and the components thereof were homogeneously dispersed in a short time. In contrast, the resin composition for sample 9 was slowly melted due to poor thermal conductivity thereof and the components thereof required a long time to disperse.

EXAMPLES 18 TO 28

Measurement methods for various properties for examples will be described.
(1) Roller Workability Test
  Measurements were performed in accordance with example 1.
(2) Mold Staining Test
  Measurements were performed in accordance with example 1.
(3) Izod Impact Test
  Measurements were performed in accordance with example 1.
(4) Tensile Strength and Elongation
  Measurements were performed in accordance with example 1.
(5) Haze (Degree of Haze) Test
  Measurements were performed in accordance with JIS 7105.
  A 1 mm-thick test piece was evaluated.
(6) V-cut Test
  Measurements were performed in accordance with example 1.
(7) Flexural Whitening Test
  Whitening at a bent portion of the test piece used in the (6) V-cut test mentioned above was observed, "No whitening" is represented by o, and "whitening occurs when the color is deep, and no whitening occurs when the color is pale such as pale gray" is represented by Δ.

In examples, some of the various resins listed below were used.
(1) A Completely Amorphous Polyester Resin (A)
  Manufacturing company: Eastman Chemical Co.
  Trade name: KODAR PETG 6763 (PET-G)
  Composition: copolymer type
  Glycol component: 70 mole percent of ethylene glycol and 30 mole percent of 1,4-cyclohexane dimethanol
  Dicarboxylic component: terephthalic acid
  Crystallinity: 0%
  Heat of fusion: Not measurable due to a completely amorphous structure
(2) Thermoplastic Polyester Elastomer (D)
  Manufacturing company: Dupont-Toray Co., Ltd.
  Trade name: Hytrel 4057, 2551
  Composition: Chemical structure is a copolymer composed of hard segments (PBT) and soft segments (polyether).
(3) Graft Copolymer (B)
  Manufacturing company: Kaneka Corp.
  Trade name: Kaneace B-56

Composition: methacrylic acid ester.styrene/butadiene rubber graft copolymer
Rubber particle diameter: 0.1 to 0.5 μm (4) Graft Copolymer (c)
Manufacturing company: Kaneka Corp.
Trade name: Kaneace FM
Composition: methacrylic acid ester.acrylonitrile/butyl acrylate (acrylic rubber) graft copolymer
Rubber particle diameter: 0.05 to 0.1 μm (5) Additive
Manufacturing company: Henkel Japan Co., Ltd.
Trade name: Roxiol G-78
Composition: Mixture of metal soap and high molecular weight ester (6) Thermoplastic Resin Sheet (F)
(i) PVC Sheet
Manufacturing company: Riken Vinyl Industry Co., Ltd.
Trade name: W500
Composition: Polyvinyl chloride resin (ii) PP Sheet
Manufacturing company: Riken Vinyl Industry Co., Ltd.
Trade name: OW
Composition: Polypropylene resin (iii) PE Sheet
Manufacturing company: Riken Vinyl Industry Co., Ltd.
Trade name: TPN
Composition: Polyethylene resin Compositions were prepared in accordance with the component contents shown in Tables 3 to 5, and various tests were performed on the compositions. The results are alos shown in Tables 3 to 5.

TABLE 3

|  |  | Example 18 | Example 19 | Example 20 | Example 21 | Example 22 |
|---|---|---|---|---|---|---|
| PET-G |  | 95 | 50 | 70 | 90 | 95 |
| Hytrel 4057 |  | 5 |  |  |  |  |
| Hytrel 2551 |  |  | 50 | 30 | 10 | 5 |
| G-78 |  | 0.7 | 0.7 | 0.7 | 0.7 | 0.7 |
| Roller workability |  | ○ | ○ | ○ | ○ | ○ |
| Mold contamination |  | ○ | ○ | ○ | ○ | ○ |
| Izod impact value | KJ/m$^2$ | 7.1 | NB | 20.3 | 7.0 | 6.0 |
| Tensile strength | Kgf/mm$^2$ | 4.4 | 3.0 | 3.4 | 4.3 | 4.4 |
| Tensile elongation before acceleration | % | 310 | 350 | 340 | 320 | 315 |
| Tensile elongation after acceleration | % | 295 | 345 | 330 | 310 | 310 |
| Haze value 1 mm thick | % | 21.1 | 40.3 | 21.2 | 14.2 | 14.0 |
| Flexural whitening test |  | ○ | ○ | ○ | ○ | ○ |
| V-cut test |  | ○ | ○ | ○ | ○ | ○ |

TABLE 4

|  |  | Example 23 | Example 24 |
|---|---|---|---|
| PET-G |  | 99 | 99.5 |
| Hytrel 4057 |  |  |  |
| Hytrel 2551 |  | 1 | 0.5 |
| G-78 |  | 0.7 | 0.7 |
| Roller workability |  | ○ | ○ |
| Mold contamination |  | ○ | ○ |
| Izod impact value | KJ/m$^2$ | 5.3 | 5.2 |
| Tensile strength | Kgf/mm$^2$ | 4.4 | 4.5 |
| Tensile elongation (before acceleration) | % | 300 | 300 |
| Tensile elongation (before acceleration) | % | 150 | 120 |
| Haze value 1 mm thick | % | 13.6 | 13.5 |
| Flexural whitening test |  | ○ | ○ |
| V-cut test |  | ○ | ○ |

TABLE 5

|  |  | Example 25 | Example 26 | Example 27 | Example 28 |
|---|---|---|---|---|---|
| PET-G |  | 90 | 95 | 100 | 90 |
| Hytrel 4057 |  |  |  |  |  |
| Hytrel 2551 |  |  |  |  |  |
| B-56 |  | 10 | 5 |  |  |
| FM |  |  |  |  | 10 |
| G-78 |  | 0.7 | 0.7 | 0.7 | 0.7 |
| Roller workability |  | ○ | ○ | ○ | ○ |
| Mold contamination |  | ○ | ○ | ○ | ○ |
| Izod impact value | KJ/m$^2$ | 83 | 10 | 5 | 7 |

TABLE 5-continued

|  |  | Example 25 | Example 26 | Example 27 | Example 28 |
|---|---|---|---|---|---|
| Tensile strength | Kgf/mm² | 3.9 | 4.2 | 4.5 | 4.0 |
| Tensile elongation (before acceleration) | % | 290 | 280 | 300 | 290 |
| Tensile elongation (before acceleration) | % | 275 | 260 | 0 | 270 |
| Haze value 1 mm thick | % | 99.8 | 94.5 | 13.0 | 99.9 |
| Flexural whitening test |  | Δ | Δ | ○ | Δ |
| V-cut test |  | ○ | ○ | x | ○ |

EXAMPLE 29

In order to prepare an under layer, a 80 μm-thick resin sheet (the composition thereof being the same as for example 21) was prepared by a calendering machine followed by coloring with titanium oxide and an organic pigment, and was then provided with a printed layer 1.5±0.5 μm thick (Nippon Decor K.K., Woodgrain) on the upper surface thereof. After the printed layer was cured, a solvent-type two-component adhesive agent (Toyo-Morton, Ltd., AD527/CATHY-92) was coated on the upper surface of the printed layer by a gravure coating method. After coating, the solvent was vaporized in a drying oven, to thus obtain an adhesive layer (2.5±0.5μ thick). The drying oven was provided with a floating method type drying zone and the temperature therein was set to be 75 to 85° C. The resin sheet was passed through the drying oven in 18 to 22 seconds. After the adhesive layer was dried, an 80 μm-thick resin sheet of example 21 to be used as an upper layer was overlaid on the adhesive layer, and was then heat-sealed by using metal rollers.

Subsequently, the sheet was rolled up, and left at 40±2° C. for 72 hours to age the adhesive agent, to whereby obtain a product. A flexural whitening test and a V-cut test were performed on the resultant laminated decorative sheet. The results are shown in Table 6.

EXAMPLES 30 TO 34

The under layers for examples 30 to 34 were changed as described below, and then the same tests were performed as those performed for example 16.

In this connection, example 31 was not provided with a printed layer, so that the test was for a colored decorative sheet.

EXAMPLE 30

Upper layer: 80 μm in thickness, composition of example 21, and original color

Printed layer: woodgrain printed on an under layer

Under layer: 80 μm in thickness, colored composition of example 26 (colored by titanium oxide, an organic pigment, and the like)

EXAMPLE 31

Upper layer: 80 μm in thickness, composition of example 21, and colored

Under layer: 80 μm in thickness, composition of example 26, and colored (colored by titanium oxide, an organic pigment, and the like)

EXAMPLE 32

Upper layer: 80 μm in thickness, composition of example 21, and original color

Printed layer: woodgrain printed on an under layer

Under layer: 80 μm in thickness, manufactured by Riken Vinyl Industry Co., Ltd. (PVC sheet, and W500 colored product)

EXAMPLE 33

Upper layer: 80 μm in thickness, composition of example 21, and original color

Printed layer: woodgrain printed on an under layer

Under layer: 80 μm in thickness, manufactured by Riken Vinyl Industry Co., Ltd. (PP sheet, and OW colored product)

EXAMPLE 34

Upper layer: 80 μm in thickness, composition of example 21, and original color

Printed layer: woodgrain printed on an under layer

Under layer: 80 μm in thickness, manufactured by Riken Vinyl Industry Co., Ltd. (PE sheet, and TPN colored product)

The results obtained for examples 29 to 34 are shown in Table 6.

TABLE 6

|  | Example 29 | Example 30 | Example 31 | Example 32 | Example 33 | Example 34 |
|---|---|---|---|---|---|---|
| Upper layer | 80 μm Example 21 Composition Original color | 80 μm Example 21 Composition Original color | 80 μm Example 21 Composition Colored | 80 μm Example 21 Composition Original color | 80 μm Example 21 Composition Original color | 80 μm Example 21 Composition Original color |
| Woodgrain Printed layer | Yes | Yes | No | Yes | Yes | Yes |
| Under layer | 80 μm Example 21 Composition Colored | 80 μm Example 26 Composition Colored | 80 μm Example 26 Composition Colored | 80 μm Riken Vinyl W500 PVC Colored | 80 μm Riken Vinyl OW PP Colored | 80 μm Riken Vinyl TPN PE Colored |
| Flexural whitening test | ○ | ○ | ○ | ○ | ○ | ○ |
| V-cut test | ○ | ○ | ○ | ○ | ○ | ○ |

EXAMPLES 35 AND 36

Examples 35 and 36 were comparative examples, in which the materials used for examples 30 and 34 were used for examples 35 and 36, respectively, and the upper layer and the lower layer were disposed in reverse relation. In addition, laminated sheets for examples 35 and 36 were formed by laminating an original color sheet as an upper layer with a colored decorative sheet as an under layer. Lamination methods and measurement methods were the same as those for example 29.

EXAMPLE 35

Upper layer: 80 $\mu$m in thickness, composition of example 26, and original color
Printed layer: Woodgrain printed on an under layer
Under layer: 80 $\mu$m in thickness, composition of example 21, and colored

EXAMPLE 36

Upper layer: 80 $\mu$m in thickness, manufactured by Riken Vinyl Industry Co., Ltd. (PE sheet, and TPN original color)
Printed layer: Woodgrain printed on an under layer
Under layer: 80 $\mu$m in thickness, composition of example 21, and colored The results for examples 35 and 36 are shown in Table 7.

TABLE 7

|  | Example 35 | Example 36 |
|---|---|---|
| Upper layer | 80 $\mu$m<br>Example 26<br>Composition | 80 $\mu$m<br>Riken Vinyl<br>TPN<br>PE |
|  | Original color | Original color |
| Woodgrain<br>Printed layer | Yes | Yes |
| Under layer | 80 $\mu$m<br>Example 21<br>Composition<br>Colored | 80 $\mu$m<br>Example 21<br>Composition<br>Colored |
| Flexural<br>whitening test | x | x |
| V-cut test | ○ | ○ |

EXAMPLES 37 TO 75

By using materials listed below, (1) a transfer foil, (2) a 0.2 mm-thick polyester sheet, and (3) a 0.15 mm-thick polyester sheet were prepared in accordance with the compositions shown in Tables 8 to 11, (1), (2), and (3) were laminated in order, and the laminate thus formed was then heat-sealed by rollers having metallic mirror finished surfaces at 150 to 160° C. for 40 seconds (nip pressure: 2.0 kg/cm, drum rotation speed: 2.0 m/min., and drum circumference: 2.0 m). The polyester sheet was formed by a T-die extruder to have a desired thickness.

Next, a laminated sheet was adhered onto an adherend described below by a membrane-pressing machine (Name of machine: KT-M-139, Manufacturer: Benhorner). Adhesion conditions were set so that pressing temperatures were top/bottom=110° C./80° C., pressing times were pre-heat/pressurization=60 seconds/60 seconds, and pressure was 4 kg/cm$^2$.

The adherend (MDF) was plywood which was formed by finely pulverizing chips of conifers, lauan, or the like followed by solidifying by pressing. The adherend was cut into a shape of a door (approximately 150 mm×200 mm, and 18 mm thick) for assembly in an integrated kitchen system or the like, and curved surfaces (approximately 3R to 10R) were formed thereon. Decorative grooves (called "routing") were engraved on the top surface of the adherend.

Before adhesion, an adhesive agent, such as a urethane adhesive agent (a mixture of trade name 34333 and trade name Hardener D, Henmitine Co., in a weight ratio of 100 and 5), was coated on the door shaped MDF surface.

Materials Used in Examples
(1) Transfer Foil Trade Name: UV-03 by Keihan Oike Transcription K.K.
    Type: Acrylic transfer foil, 12 $\mu$m thick
(2) Polyester Sheet
    A completely amorphous polyester resin (A)
    Manufacturing company: Eastman Chemical Co.
    Trade name: KODAR PETG 6763 (PET-G)
    Composition: copolymer type
    Glycol component: 70 mole percent of ethylene glycol and 30 mole percent of 1,4-cyclohexane dimethanol
    Dicarboxylic component: terephthalic acid
    Crystallinity: 0%
    Heat of fusion: Not measurable due to a completely amorphous structure
    Graft copolymer (B)
    Manufacturing company: Kaneka Corp.
    Trade name: Kaneace B-56
    Composition: methacrylic acid ester.styrene/butadiene rubber graft copolymer (MBS)
    Rubber particle diameter: 0.1 to 0.5 $\mu$m
    Thermoplastic polyester elastomer (D)
    Manufacturing company: Dupont-Toray Co., Ltd.
    Trade name: Hytrel 2551 (Hytrel)
    Composition: Chemical structure is a copolymer composed of hard segments (PBT) and soft segments (polyether).
    Polyester Resin (E)
    (i)
    Manufacturing company: Eastman Chemical Co.
    Trade name: EASTER PCTG 5445 (PCTG)
    Composition: Copolymer type
    Glycol modified polycyclohexylene dimethylene terephthalate composed of 100 mole percent of terephthalic acid, 42 to 32 mole percent of ethylene glycol, and 58 to 68 mole percent of 1,4-cyclohexane dimethanol
    Crystalline component (Degree of crystallinity): trace
    Heat of fusion: 2.6 (cal/g)
    (ii)
    Manufacturing company: Eastman Chemical Co.
    Trade name: THERMX PCTA 6761 (PCTA)
    Composition: Copolymer type
    Acid modified polycyclohexylene dimethylene terephthalate composed of 1 to 50 mole percent of isophthalic acid and 50 to 99 mole percent of terephthalic acid, as dicarboxylic components, and preferably, composed of 1 to 25 mole percent of isophthalic acid and 75 to 99 mole percent of terephthalic acid
    Heat of fusion: 5.5 (cal/g)
(3) Polyester Sheet
    Manufacturing company: Riken vinyl Industry Co., Ltd.
    Trade name: RIVESTAR SET351 FZ13359
    Composition: Copolymer type
    Crystalline component (Degree of crystallinity): 0%
    Tests listed below were performed for obtained molded parts.
    Transparency: Determined by visual inspection. Levels of determination were as follows. Superior transparency is represented by ○, slight white turbidity is represented by Δ, and white turbidity is represented by x.
    Pencil hardness test: In accordance with JIS K5400 (loading weight: 200 g)
    Stress cracking test by detergent: Kitchen detergent (Magicline, Kao Corp.) was sufficiently coated on molded parts, and the molded parts were held at room temperature for 24 hours. Subsequently, after the molded parts were stored at 50° C. for 90 minutes followed by being stored at 0° C. for 90 minutes, the surfaces of the molded parts were visually inspected for cracks. Levels of determination were as follows. No cracking is represented by ○, existence of a few cracks (approximately 1 to 10) is represented by Δ, existence of a number of cracks (not less than 10) is represented by x, and existence of cracks over the entirety of the surfaces is represented by xx. The results are shown in Tables 8 to 11.

TABLE 8

| | Example | | | | | | | | | | |
|---|---|---|---|---|---|---|---|---|---|---|---|
| | | 37 | 38 | 39 | 40 | 41 | 42 | 43 | 44 | 45 | 46 | 47 |
| PETG | | — | 23 | — | 23 | — | 23 | — | 23 | 20 | 20 | 20 |
| PCTG | | 80 | 70 | — | — | 80 | 70 | — | — | 70 | 70 | — |
| PCTA | | — | — | 80 | 70 | — | — | 80 | 70 | — | — | 70 |
| MBS | | — | — | — | — | 20 | 7 | 20 | 7 | 2 | 8 | 2 |
| Hytrel | | 20 | 7 | 20 | 7 | — | — | — | — | 8 | 2 | 8 |
| Transparency | | x | ○ | x | Δ | x | Δ | x | Δ | Δ | Δ | Δ |
| Pencil hardness | | HB | HB | H | HB | HB | HB | H | HB | HB | HB | HB |
| Stress cracking | Top surface | ○ | ○ | ○ | ○ | ○ | ○ | ○ | ○ | ○ | ○ | ○ |
| | Router | ○ | ○ | ○ | ○ | ○ | ○ | ○ | ○ | ○ | ○ | ○ |
| | Side surface | ○ | ○ | ○ | ○ | ○ | ○ | ○ | ○ | ○ | ○ | ○ |

Note: parts by weight

TABLE 9

| | Example | | | | | | | | | | |
|---|---|---|---|---|---|---|---|---|---|---|---|
| | | 48 | 49 | 50 | 51 | 52 | 53 | 54 | 55 | 56 | 57 | 58 |
| PETG | | 20 | 65 | 40 | 65 | 40 | 40 | 40 | 40 | 65 | 40 | 40 |
| PCTG | | — | 5 | 30 | — | — | — | 30 | 30 | — | — | — |
| PCTA | | 70 | — | — | 5 | 30 | 30 | — | — | 5 | 30 | 30 |
| MBS | | 8 | — | — | — | — | 30 | 5 | 25 | 5 | 5 | 25 |
| Hytrel | | 2 | 30 | 30 | 30 | 30 | — | 25 | 5 | 25 | 25 | 5 |
| Transparency | | Δ | Δ | x | ○Δ | Δx | xx | x | xx | x | x | xx |
| Pencil hardness | | HB | 2B | 2B | 2B | B | B | B | B | 2B | B | B |
| Stress cracking | Top surface | ○ | ○ | ○ | ○ | ○ | ○ | ○ | ○ | ○ | ○ | ○ |
| | Routing | ○ | ○ | ○ | ○ | ○ | ○ | ○ | ○ | ○ | ○ | ○ |
| | Side surface | ○ | ○ | ○ | ○ | ○ | ○ | ○ | ○ | ○ | ○ | ○ |

Note: parts by weight

TABLE 10

| | Example | | | | | | | | | |
|---|---|---|---|---|---|---|---|---|---|---|
| | | 59 | 60 | 61 | 62 | 63 | 64 | 65 | 66 | 67 |
| PETG | | 100 | 93 | 70 | — | 50 | — | 50 | 93 | 70 |
| PCTG | | — | — | — | 100 | 50 | — | — | — | — |
| PCTA | | — | — | — | — | — | 100 | 50 | — | — |
| MBS | | — | — | — | — | — | — | — | 7 | 30 |
| Hytrel | | — | 7 | 30 | — | — | — | — | — | — |
| Transparency | | ○ | ○ | ○Δ | ○ | ○ | ○ | ○ | Δ | Δx |
| Pencil hardness | | B | B | 2B | B | B | HB | HB | B | 3B |
| Stress cracking | Top surface | xx | xx | ○ | x | x | Δ | x | xx | Δ |
| | Routing | xx | x | Δ | x | x | x | x | x | Δ |
| | Side surface | xx | xx | ○ | ○ | x | x | x | xx | ○ |

Note: parts by weight

TABLE 11

| | Example | | | | | | | |
|---|---|---|---|---|---|---|---|---|
| | 68 | 69 | 70 | 71 | 72 | 73 | 74 | 75 |
| PETG | 65 | 40 | 23 | — | 65 | 65 | 65 | 65 |
| PCTG | 5 | 30 | 70 | 80 | — | 5 | 5 | — |
| PCTA | — | — | — | — | 5 | — | — | 5 |
| MBS | 30 | 30 | 7 | 20 | 30 | 5 | 25 | 25 |
| Hytrel | — | — | — | — | — | 25 | 5 | 5 |
| Transparency | Δx | xx | x | xx | Δ | x | xx | xx |
| Pencil hardness | 2B | 2B | HB | HB | 2B | 2B | 2B | 2B |
| Stress cracking Top surface | Δ | Δ | ○Δ | ○Δ | Δ | Δ | Δ | Δ |
| Routing | Δ | ○ | Δ | ○Δ | Δ | ○ | Δ | Δ |
| Side surface | ○ | ○ | ○ | ○ | Δ | ○ | ○ | ○ |

Note: parts by weight

Industrial Applicability

According to the present invention, a resin composition and a resin sheet specifically suitable for membrane pressing, vacuum pressing, air pressing, and the like are provided, in which the resin composition and the resin sheet have superior properties, such as workability, moldability, impact resistance, transparency, and the like, and in addition, plate-out is not significantly observed and whitening during embossing and heat-sealing is unlikely to occur.

What is claimed is:

1. A resin sheet obtained by molding a resin composition comprising 50 to 99.9 percent by weight of a completely amorphous polyester resin (A) and 0.1 to 50 percent by weight of a thermoplastic polyester elastomer (D), wherein at least one lubricant selected from the group consisting of hydrocarbons, fatty acids, aliphatic alcohols, aliphatic amides, aliphatic esters and fatty acidic metal soaps is further added to said resin composition.

2. A resin sheet according to claim 1, wherein the resin sheet is colored and/or has a printed surface.

3. A laminated resin sheet obtained by laminating at least two layers of a resin sheet according to claim 1.

4. A laminated resin sheet obtained by laminating at least two layers of a resin sheet according to claim 2.

5. A laminated resin sheet obtained by laminating two resin sheets, wherein a resin sheet according to claim 1 is used as an upper layer and a resin sheet according to claim 2 is used as an under layer.

6. A laminated resin sheet obtained by laminating two resin sheets, wherein a resin sheet according to one of claims 1 and 2 is used as an upper layer and a thermoplastic resin sheet is used as an under layer.

* * * * *